United States Patent
Dawson-Elli et al.

(10) Patent No.: US 6,326,325 B1
(45) Date of Patent: Dec. 4, 2001

(54) METHOD FOR FABRICATING SILICON OXYNITRIDE

(75) Inventors: David F. Dawson-Elli, Painted Post; Carlton M. Truesdale, Corning, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/463,461

(22) PCT Filed: Aug. 5, 1998

(86) PCT No.: PCT/US98/16358

§ 371 Date: Jan. 18, 2000

§ 102(e) Date: Jan. 18, 2000

(87) PCT Pub. No.: WO99/11573

PCT Pub. Date: Mar. 11, 1999

(51) Int. Cl.[7] ................................................. C04B 35/58
(52) U.S. Cl. ..................... 501/96.5; 501/97.1; 423/325
(58) Field of Search .................... 423/325; 501/96.5, 501/97.1; 427/226

(56) References Cited

U.S. PATENT DOCUMENTS

| | | | | |
|---|---|---|---|---|
| 4,021,529 | * | 5/1977 | Kuriakose | 423/325 |
| 4,043,823 | * | 8/1977 | Washburn et al. | 106/40 |
| 5,166,104 | * | 11/1992 | Funayama et al. | 501/95 |

OTHER PUBLICATIONS

Journal of Material Science vol 30 "Synthesis of silicon oxynitride from a polymeric percursor–Part IV Pyrolysis of the copolymers" by Yu et al pp 5371–5380, 1995.*

* cited by examiner

*Primary Examiner*—Jean F. Vollano
(74) *Attorney, Agent, or Firm*—Timothy R Krogh; Joseph M. Homa

(57) ABSTRACT

A method for making silicon oxynitride comprising providing a vaporous gas stream of a compound selected from the group consisting of silazanes and siloxazanes. An enclosed, heated reaction site is also provided. The vaporous gas stream is delivered to the enclosed, heated reaction site in which the levels of oxygen are strictly controlled to promote the formation of silicon oxynitride particles.

22 Claims, No Drawings

METHOD FOR FABRICATING SILICON OXYNITRIDE

This application is a 371 of PCT/US98/16358 filed Aug. 5, 1998 now WO99/11513.

FIELD OF THE INVENTION

The present invention relates to nitrogen doped silica, which may also be called silicon oxynitride or $SiO_xN_y$. More particularly, the present invention relates to nitrogen doped silica formed by using silazane or siloxazane starting materials.

BACKGROUND OF THE INVENTION

Silicon oxynitride is used in a variety of applications. The ability to vary the refractive index of silicon oxynitride over a wide range makes it an attractive material for optical applications. The refractive index of pure $SiO_2$ is 1.46, and the refractive index of $Si_3N_4$ is 2.1. Therefore, the refractive index of silica doped with nitrogen can be varied between 1.46 and 2.1. In addition. doping silica optical waveguides with nitrogen helps to prevent UV radiation damage to the waveguide which causes undesirable losses.

In optical waveguide applications, silicon oxynitride has been produced by plasma and nonplasma CVD processes, using silane and/or ammonia gases. For optical applications, however, use of ammonia is undesirable because ammonia contains hydrogen, and the resulting synthesized silicon oxynitride may contain a substantial proportion of hydrogen which significantly contributes to losses in the waveguide.

In addition, silane raw materials must be handled very carefully due to the violent reaction caused when air is introduced into a closed container of silane. Silane is typically used in producing thin films on semiconductor substrates, which requires the deposition of a film having good characteristics for semiconductor applications. In the manufacture of semiconductor thin films the properties of the film are more important than deposition rate. In the production of optical devices, however, large quantities of material must be produced quickly, and the deposition rates for producing optical devices such as optical waveguides are much faster than deposition rates for semiconductor thin films.

Silicon oxynitride may also be produced by the pyrolysis or hydrolysis of organometallic halides such as silicon tetrachloride. However, use of halides is not favored because the pyrolysis and hydrolysis of these materials produces chlorine or a very strong acid by-product, hydrochloric acid (HCl). Hydrochloric acid is detrimental not only to many deposition substrates and to reaction equipment but also is harmful to the environment.

Additionally, it is difficult to produce bulk silicon oxynitride and waveguide preforms using conventional outside vapor deposition (OVD) processes, which expose the deposited material to air. One difficulty encountered in forming silicon oxynitride using conventional OVD processes is that when processing occurs in a system open to air, oxygen atoms preferentially bond to silicon atoms over nitrogen atoms, forming silica instead of silicon oxynitride.

In a typical OVD process, a carrier gas is bubbled through a liquid organic silicon containing compound. The resulting vaporous compound is transported to a burner via a carrier gas, wherein the vaporous gas streams are combusted in a burner flame fueled with natural gas and oxygen. The presence of oxygen in conventional OVD processes converts the vaporous reactants to their respective oxides, exiting the burner orifice to form a stream of volatile gases and finely-divided spherical particles of soot that may be deposited onto a substrate forming a porous blank or preform of soot, for example, silica soot.

U.S. Pat. No. 5,152,819 to Blackwell et al., the disclosure of which is incorporated by reference, describes the use halide-free silicon containing compounds including octamethylcylotetrasilazane in an OVD process to produce high purity fused silica glass. Octamethylcyclotetrasilazane, [(CH3)2SiNH]4, hereinafter referred to as OMCTSZ, is a white solid at room temperature and has a boiling point of 225° C. An OVD process described in U.S. Pat. No. 5,152,819, which used OMCTSZ as a feedstock for the process produced a pure silica soot with less than 0.01% nitrogen contained in the soot.

In view of the difficulties encountered in manufacturing silicon oxynitride, there is an explicit need for a method for manufacturing silicon oxynitride which avoids the aforementioned problems. Specifically, it would be desirable to provide a method for manufacturing silicon oxynitride which does not contain a substantial proportion of hydrogen. In addition, it would be desirable to provide a process which avoids the preferential bonding of oxygen atoms to silicon atoms, which results in the formation of pure silica.

SUMMARY OF INVENTION

Applicants have discovered a method for manufacturing silicon oxynitride comprising the steps of providing a vaporous gas stream of a compound selected from the group consisting of siloxazanes and silazanes. As one example of processing a compound in accordance with the method of the present invention, solid octamethylcyclotetrasilazane (OMCTSZ) is heated, preferably to a temperature of about 130° C. to about 225° C., to provide OMCTSZ liquid, and a vaporous gas stream may be provided by bubbling an inert carrier gas through the OMCTSZ liquid to create a vaporous OMCTSZ gas stream. The vaporous silazane gas stream is delivered to an enclosed reaction site which is heated to a temperature of at least about 500° C., preferably between 700° C. and about 900° C., where the gas stream is converted into particles of silicon oxynitride containing greater than 0.1% nitrogen by weight.

In an important aspect of the invention, the amount of oxygen present at the reaction site is strictly limited to prevent formation of pure silica at the reaction site and to promote the formation of silicon oxynitride. Preferably the level of oxygen at the reaction site is limited to very low levels by controlling the partial pressure of oxygen in the enclosed reaction site. The amount of oxygen present at the reaction site will depend on the desired composition of the silicon oxynitride end product produced by the method of the present invention. The stream of vaporous silazane forms silicon oxynitride at the heated reaction site. In an alternative embodiment, the stream of vaporous silazane gas can be combined with a vaporous gas stream of a silicon containing compound such as octamethylcyclotetrasiloxane.

Thus, the present invention provides a method for manufacturing silicon oxynitride which does not contain a substantial proportion of hydrogen and provides a method which avoids the preferential bonding of oxygen atoms to silicon atoms encountered in OVD processes. Additional features and advantages of the invention will be set forth in the description which follows, and in part will be apparent from the description. or may be learned by practice of the invention. It is to be understood that both the foregoing general description and the following detailed description are exemplary and explanatory and are intended to provide further explanation of the invention as claimed.

DETAILED DESCRIPTION

Reference will now be made in detail to a preferred embodiment of the invention. The present invention provides a method of manufacturing silicon oxynitride using silazane or siloxazane starting materials.

The present invention provides a method of manufacturing silicon oxynitride comprising the steps of providing a vaporous gas stream of a siloxazane or a silazane and delivering the vaporous gas stream to an enclosed reaction site, which is heated to a temperature of at least about 500° C. As used in this application, the term "silazane" means an organosilicon nitrogen compound containing one or more silicon-nitrogen bonds, including amino silazanes, linear silazanes, and cyclosiloxanes, wherein a nitrogen atom and a single element or group of elements are bonded to the silicon atom. The term "siloxazane" as used in this application are compounds containing the unit [O—Si—N], including linear and cyclic siloxanes. A variety of silazanes and siloxazane may be used in the method of the present invention, including polysilazanes and polysiloxazanes.

Delivery of the vaporous silazane or siloxazane gas stream to the reaction site may be accomplished by using an inert carrier gas such as nitrogen, argon, or helium. Advantageously, the amount of oxygen present at the reaction site is strictly limited to prevent the formation of silica. The amount of oxygen at the reaction site is limited by controlling the partial pressure of the oxygen in the enclosed reaction site.

In an exemplary embodiment, a vaporous silazane gas stream is provided by heating solid octamethylcyclotetrasilazane (OMCTSZ) to provide OMCTSZ liquid. The solid OMCTSZ should be heated to at least about 120° C., preferably to about 140° C., to melt the OMCTSZ to its liquid state. The solid OMCTSZ may be contained in a vessel and heated with any suitable heat source such as a hot plate, an oil bath, or heat tape. The method may further comprise bubbling an inert carrier gas through the OMCTSZ liquid to create a vaporous OMCTSZ gas stream. As used in this specification "inert gas" means a nonreactive gas, such as argon, nitrogen. or helium. The vaporous OMCTSZ is then delivered to an enclosed reaction site heated to about 700° C. to about 800° C., where the amount of oxygen is strictly controlled to promote the formation of $SiO_xN_y$ particles containing greater than 0.1% nitrogen by weight.

The enclosed reaction site may be, for example, a fused silica tube. The tube may be placed in a furnace to heat the reaction site or the tube may be surrounded by a heating element or a flame. By sealing the tube. the amount of oxygen inside the tube may be controlled. The vaporous OMCTSZ gas may be delivered by into the tube by a mass flow controller.

The oxygen present at the reaction site may be controlled several ways. For example, delivering oxygen to the reaction site via a mass flow controller enables control of the amount of oxygen in the composition of the final SiON product. Limiting the amount of oxygen present at the reaction site promotes the formation silicon oxynitride and prevents the formation of pure silica. The composition of the silicon oxynitride produced by the process of the present invention can be varied according to the desired end use of the material. The material may, for example, be used for optical waveguide applications. and the amount of nitrogen in the silicon oxynitride composition would depend on the optical properties of the waveguide such as the desired refractive index profile of the waveguide. For any desired composition, the optimum flow rate of the OMCTSZ gas stream and oxygen gas can be determined by experimentation.

The amount of oxygen present at the reaction site may also be limited by simply enclosing the reaction site for example in a sealed tube, and allowing the reaction to occur with the oxygen present in the ambient air inside the tube. Thus, to form SiON, it may not be necessary to supply any oxygen to the reactor tube. For example, in one experimental run, solid OMCTSZ was heated to 133° C. to form OMCTSZ liquid, and 200 standard cubic centimeters per minute of nitrogen was bubbled through the liquid to form a vaporous OMCTSZ gas stream. The OMCTSZ gas stream was delivered to a reaction site, which was a silica tube heated to 750° C. No oxygen was added to the reaction site. and the final SiON material produced contained 25.84% oxygen, as determined by electron spectroscopy for chemical analysis (ESCA).

As mentioned above, the silicon oxynitride made by the method of the present invention may be used for optical waveguides. As previously discussed, the refractive index of $Si_3N_4$ is higher than the refractive index of $SiO_2$, By doping a silica waveguide with nitrogen to form $SiO_xN_y$, a waveguide core may be formed, over which a silica cladding may be added to form an optical waveguide. The amount of nitrogen contained within the core material will depend on the desired refractive index profile of the waveguide.

If desired, the reaction stream of vaporous silazane or siloxazane can be combined with the with reaction stream of another silicon containing organic material such as octamethylcyclotetrasiloxane, which is delivered to the reaction site to provide an additional silica source material. An optical waveguide preform may be fabricated by using the method of the present invention wherein silicon oxynitride is deposited inside a fused silica tube. Thus, the silicon oxynitride deposited material forms a core region having a higher index of refraction than the cladding region which may comprise the wall of the silica tube.

If the material formed according to the method of the present invention is to be used as a waveguide, the processes following the formation of the waveguide blank would follow those practiced in industry. In conventional practice, optical waveguide fabrication is a three-step process. Most of the processes currently used for the manufacture of optical waveguides involve a laydown process wherein a blank is manufactured by a CVD process such as OVD, MCVD, AVD, or PCVD. The second stage of an optical fiber manufacturing process typically involves heat treating the blank in a helium/chlorine atmosphere to full consolidation. The third stage the blank is drawn into a waveguide such as a waveguide fiber.

It will be apparent to those skilled in the art that various modifications and variations can be made in the of the present invention without departing from the spirit or scope of the invention. Thus, it is intended that the present invention cover the modifications and variations of this invention provided they come within the scope of the appended claims and their equivalents.

What is claimed is:

1. A method of manufacturing silicon oxynitride comprising the steps of:

providing a vaporous gas stream of a compound selected from the group comprising silazanes and siloxazanes;

providing an enclosed reaction site heated to a temperature of at least about 500° C.;

limiting the amount of oxygen present at the reaction site; and delivering the vaporous gas stream to the reaction site without ammonia to form silicon oxynitride containing greater than 0.1% nitrogen by weight.

2. The method of claim 1 wherein the silazane is polysilazane.

3. The method of claim 2 wherein the polysilazane is a cyclopolysilazane.

4. The method of claim 3 wherein the cyclopolysilazane is octamethylcyclotetrasilazane.

5. The method of claim 4 wherein the step of providing a vaporous gas stream comprises the steps of:

heating solid octamethylcyclotetrasilazane to provide octamethylcyclotetrasilazane liquid; and bubbling an inert carrier gas through the octamethylcyclotetrasilazane liquid to create a vaporous octamethylcyclotetrasilazane gas stream.

6. The method of claim 5 wherein the carrier gas is selected from the group consisting of nitrogen, argon and helium.

7. The method of claim 6 wherein the reaction site is heated to a temperature of about 700° C. to about 800° C.

8. The method of claim 7 wherein the solid octamethylcyclotetrasilazane is heated to a temperature of at least about 130° C. to about 225° C.

9. The method of claim 8 wherein the enclosed reaction site is a fused silica tube.

10. The method of claim 9 further comprising the step of combining the octamethylcyclotetrasilazane gas stream with a vaporous gas stream of a silicon containing compound.

11. The method of claim 1 wherein the step of providing a vaporous gas stream comprises providing the compound in a liquid state and bubbling an inert carrier gas through the compound to form the vaporous gas stream.

12. The method of claim 11 wherein the step of providing a vaporous gas stream comprises providing the compound in a solid state and heating the compound into a liquid state.

13. The method of claim 11 wherein the inert carrier gas is selected from the group consisting of nitrogen, argon and helium.

14. The method of claim 1 wherein the compound is below its boiling point before delivery to the reaction site.

15. A method of manufacturing silicon oxynitride comprising the steps of:

providing a vaporous octamethylcyclotetrasilazane gas stream, including heating solid octamethylcyclotetrasilazane into liquid octamethylcyclotetrasilazane and bubbling an inert carrier gas through the octamethylcyclotetrasilazane liquid;

providing an enclosed reaction site heated to a temperature of at least about 500° C.;

limiting the amount of oxygen present at the reaction site; and delivering the vaporous octamethylcyclotetrasilazane gas stream to the reaction site to form silicon oxynitride containing greater than 0.1% nitrogen by weight.

16. The method of claim 15 wherein the carrier gas is selected from the group consisting of nitrogen, argon, and helium.

17. The method of claim 16 wherein the reaction site is heated to a temperature of about 700° C. to about 800° C.

18. The method of claim 17 wherein the solid octamethylcyclotetrasilazane is heated to a temperature of at least about 130° C. to about 225° C.

19. The method of claim 18 wherein the enclosed reaction site is a fused silica tube.

20. The method of claim 19 further comprising the step of combining the octamethylcyclotetrasilazane gas stream with a vaporous gas stream of a silicon containing compound.

21. A method of manufacturing silicon oxynitride comprising the steps of:

providing a vaporous gas stream of a compound selected from the group comprising silazanes and siloxazanes;

providing an enclosed reaction site heated to a temperature of at least about 500° C.;

limiting the amount of oxygen present at the reaction site; and delivering the vaporous gas stream to the reaction site to form silicon oxynitride containing greater than 0.1% nitrogen by weight, wherein no ammonia is present at the reaction site.

22. A method of manufacturing silicon oxynitride comprising the steps of:

providing an octamethylcyclotetrasilazane gas stream;

providing an enclosed reaction site heated to a temperature of at least about 500° C.;

limiting the amount of oxygen present at the reaction site; and delivering the octamethylcyclotetrasilazane gas stream to the reaction site to form silicon oxynitride containing greater than 0.1% nitrogen by weight.

* * * * *